United States Patent [19]

Ogata

[11] 4,365,472
[45] Dec. 28, 1982

[54] TURBINE-TYPE INTERNAL-COMBUSTION ENGINE

[76] Inventor: Saburo Ogata, 2-11, Shonai Higashimachi 4-chome, Toyonaka-shi, Osaka 560, Japan

[21] Appl. No.: 198,954
[22] PCT Filed: Oct. 31, 1978
[86] PCT No.: PCT/JP78/00015
§ 371 Date: Jun. 25, 1980
§ 102(e) Date: Jun. 25, 1980
[87] PCT Pub. No.: WO80/00990
PCT Pub. Date: May 15, 1980

[51] Int. Cl.³ .............................................. F02C 5/00
[52] U.S. Cl. ................................................. 60/39.76
[58] Field of Search ................ 60/39.44, 39,75, 39.76, 60/39.78; 415/101

[56] References Cited

U.S. PATENT DOCUMENTS

| | | |
|---|---|---|
| 2,370,217 | 2/1945 | Wright . |
| 2,405,190 | 8/1946 | Darling ............................... 415/101 |
| 2,416,942 | 3/1947 | Newcomer . |
| 2,444,213 | 6/1948 | Weeks . |
| 3,156,093 | 11/1964 | Chapman . |
| 3,650,105 | 3/1972 | Toye . |

FOREIGN PATENT DOCUMENTS

| | | |
|---|---|---|
| 483731 | 10/1929 | Fed. Rep. of Germany . |
| 10779 | 7/1906 | Japan . |
| 33-5355 | 7/1958 | Japan . |
| 46-41964 | of 1972 | Japan . |
| 40094 | 6/1907 | Switzerland ....................... 60/39.44 |
| 559702 | 3/1944 | United Kingdom . |
| 1002596 | 7/1962 | United Kingdom . |

*Primary Examiner*—Louis J. Casaregola
*Attorney, Agent, or Firm*—Schwartz, Jeffery, Schwaab, Mack, Blumenthal & Koch

[57] ABSTRACT

The invention provides an internal-combustion engine comprising the combination of a two-cycle combustion chamber and a gas turbine and comprises a casing (49) houses a rotary wheel (1) having a row of blades (2) only on part of its periphery and a circular arc surface (8) formed on the remaining portion of the periphery and having the same radius as the path of travel of the forward blade ends. When the blade row (2) on the wheel (1) passes a discharge nozzle (31) of a combustion chamber (10), the charge is exploded in the combustion chamber, causing the resulting combustion gas to impinge directly on the blades of the row to drive the wheel.

7 Claims, 8 Drawing Figures

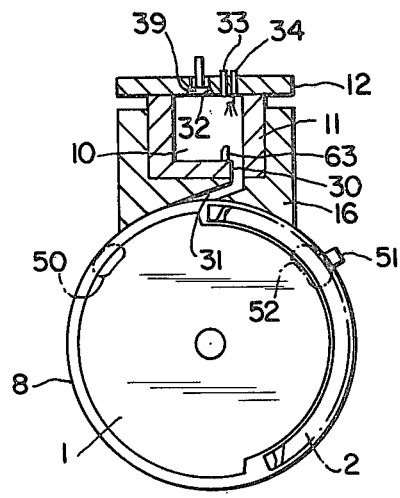
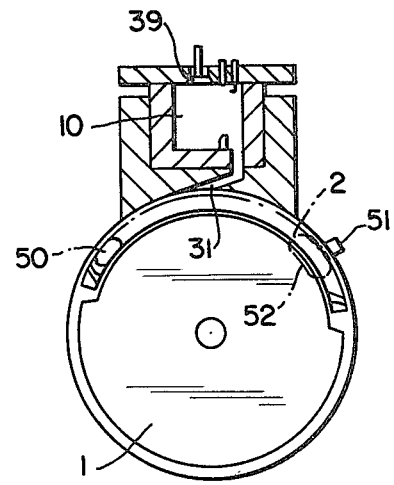
FIG. 5    FIG. 6
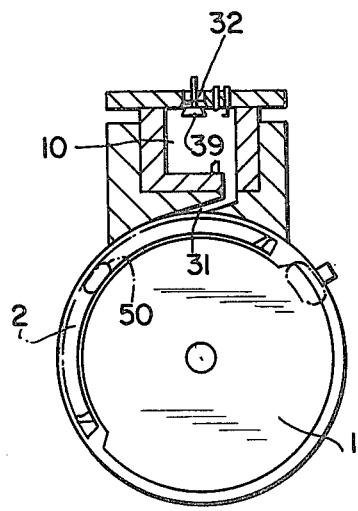
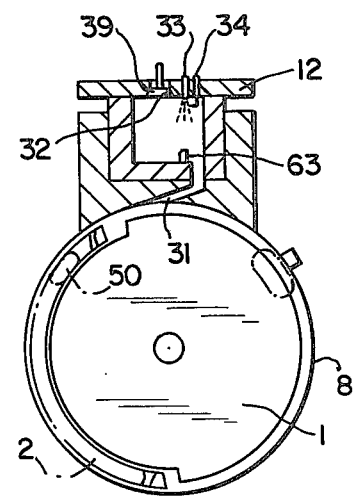
FIG. 7    FIG. 8

TURBINE-TYPE INTERNAL-COMBUSTION ENGINE

FIELD OF THE INVENTION

This invention relates to improvements in an internal-combustion turbine engine.

BACKGROUND OF THE INVENTION

Piston-type internal combustion engines involve marked vibrations attendant with the reciprocation of the piston and have the additional problem that the cylinder can not be thoroughly scavenged unless the exhaust valve is opened near the end of the combustion process an overlapping relation thereto, before the initiation of the exhaust or scavenging stroke. However, this prevents complete combustion of the fuel, contributing to reduced thermal efficiency.

Gas turbine engines are substantially free of the above problems encountered with piston-type engines since the combustion gas supplied from a combustor through a conduit is forced at a high velocity against a wheel provided with rows of blades over the entire periphery thereof to drive the wheel. However because the fuel must be continuously injected into the combustion chamber while the engine is in operation, the engine requires greater fuel consumption than piston-type engines. Additionally the necessity of supplying pressurized air to the combustor at a constant compression ratio at all times entails the problem of supplying a powerful blower and a special combustor.

SUMMARY OF THE INVENTION

The present invention is directed to a gas turbine engine comprising a rotary wheel having a row of impulse blades only on part of its circumference and a circular arc surface formed on the remaining portion of the circumference and in contact with a casing. A combustion chamber is disposed above the casing, and a nozzle is positioned communicating with the combustion chamber and having its forward end opening in the direction of a tangent to the periphery of the rotary wheel, whereby only when the row of blades on the rotary wheel passes the orifice of the nozzle, will the charge be exploded in the combustion chamber, causing the combustion gas to impinge directly on the blades of the row to thereby drive the rotary wheel by the impact.

The rotary shaft of the rotary wheel is provided with bladed plates arranged in parallel to the rotary wheel and having second and subsequent rows of blades, such as reaction blades, in phase with the first row of blades, with a row of guide blades interposed between each two adjacent rows of blades and attached to the casing so that the energy of motion and pressure of the exhaust gas forced out from the nozzle and released from the first row of blades is effectively utilized by the second and subsequent rows of blades.

The casing is formed with an air inlet for supplying fresh air to the row of blades on the rotary wheel to remove the exhaust gas from the row of blades and burn the unburned component of the combustion gas from the nozzle among the blades by secondary combustion.

With the present invention, the force of explosion of the combustion gas produced in the combustion chamber acts directly on the blades of the rotary wheel to drive the wheel, giving an exceedingly greater torque than conventional gas turbines in which the combustion gas is conducted from the combustor to a rotary bladed wheel through a duct. The larger the radius of the rotary wheel, the greater is the torque available. Since the combustion chamber is adapted for the same cycle as two-cycle ignition engines involving scavenging, injection of fuel, ignition and combustion but does not effect continued combustion unlike gas turbines, the engine of the invention achieves savings in fuel consumption. Moreover, with fresh air supplied to the spaces between the blades through the air inlet to scavenge the row of blades of the exhaust gas, the unburned component of the gas from the nozzle can be completely burned among the blades of the row, consequently inhibiting air pollution and eliminating objectionable afterburning.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 5 to 8 are diagrams illustrating the principle of the operation of the internal-combustion engine according to the invention.

DETAILED DESCRIPTION OF THE INVENTION

Figure 1:
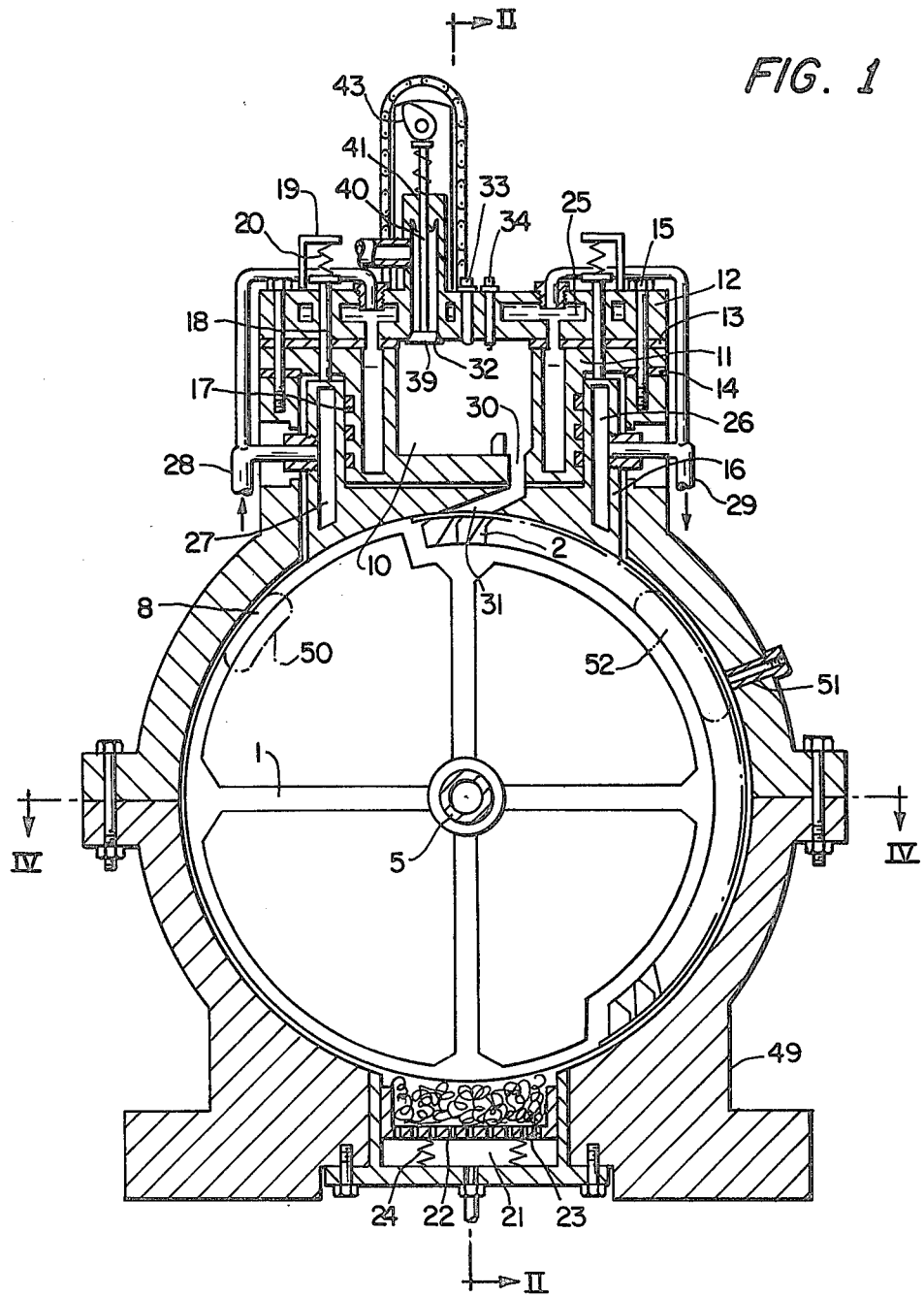
FIG. 1 is a front view in vertical section of an engine according to the invention.
Figure 2:
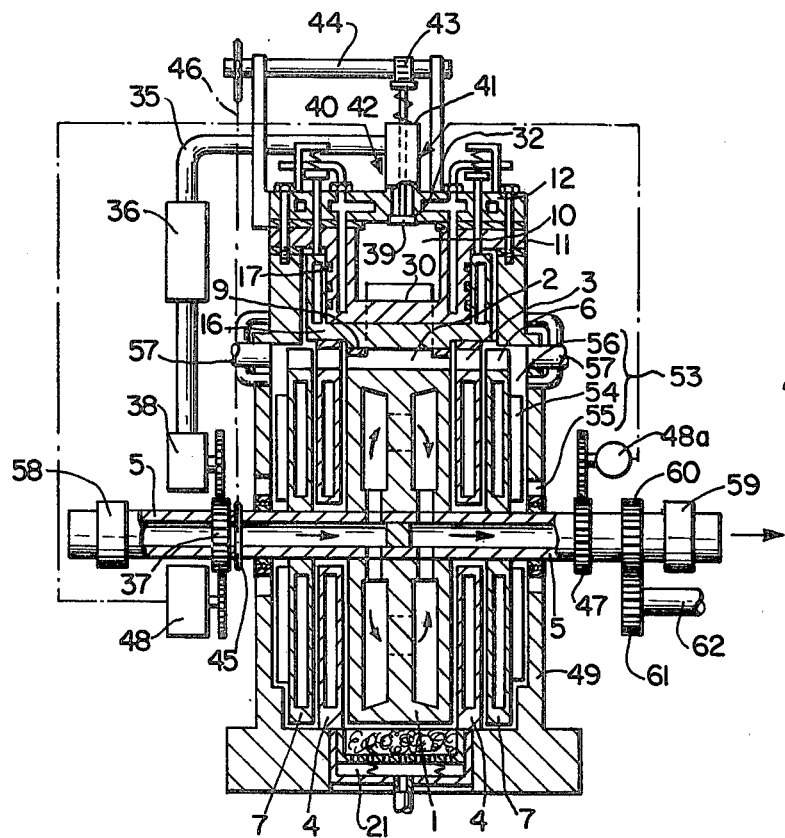
FIG. 2 is a view in section taken along the line II—II in FIG. 1.

The casing 49 of an internal-combustion engine houses a rotary wheel 1 rotatably supported therein and is provided with a combustion chamber 10 thereabove. As shown in FIGS. 1 and 2, the rotary wheel 1 has a multiplicity of impulse blades arranged on part of its circumference to provide a first blade row 2. Opposed to both sides of the rotary wheel 1 over the range of the nozzle 31 to be described later to exhaust ports 50 are stationary bladed plates 4 housed in the casing and each formed with a row of guide blades 3 aligned on its periphery. The rotary shaft 5 of the rotary wheel 1 has mounted thereon bladed plates 7 each having a second row of blades 6 in phase with the first blade row 2. In the same manner as above a guide blade row and a third blade row may be arranged on the outer side of each second blade row 6 when so desired.

The shapes of the blades can be determined according to the theory of gas turbine blades. Preferably the blades of the first row 2 are shaped as impulse blades, and the blades of the second row 6 and subsequent row as reaction blades. The guide blade row 3 serves to change the direction of flow of the gas released from the first blade row and lead the gas into the next blade row 6.

On the portion of the circumference of each of the rotary wheel 1 and the rotary bladed plates 7 where the blade row 2 or 6 is not provided, a circular arc surface 8 is formed which has the same radius as the path of movement of the outer blade ends. Connecting plates 9 and 9 arcuated in conformity with the circular arc surface 8 are attached to the blades of the first row 2 at opposite sides of their forward ends to form a continuous circle with the circular arc surface 8 and the connecting plates 9, 9.

The combustion chamber 10 is defined by a case 11 placed on the casing and a lid 12 which are fastened to the casing hermetically by bolts 15 with gaskets 13, 14 provided between the fitting faces. A nozzle member 16 is slidably fitted to the lower portion of the case 11, with packings 17 interposed between the fitting faces thereof to fit them together hermetically.

The nozzle member 16 has an inwardly curved bottom surface in the same circular arc form as the surface 8 of the rotary wheel 1 and the connecting plates 9. Holding rods 18 extending through the lid 12 and the case 11 bear on the upper end of the nozzle member 16. Springs 20 are provided between the upper ends of the holding rods 18 and lugs 19 projecting from the lid 12 to lightly press the nozzle member 16 against the outer periphery of the rotary wheel 1.

The casing 49 is formed in its lower portion with a lubricating chamber 21 filled with a lubricant and having a porous plate 22 slidably fitted therein. With heat-resistant abrasion resistant fiber 23 placed on the porous plate 22, the plate 22 is biased upward by springs 24, whereby the circular arc surface 8 of the rotary wheel 1 and the curved surfaces of the connecting plates 9 are lubricated at all times. The lid 12, the combustion chamber case 11 and the nozzle member 16 are internally formed with water chambers 25, 26 and 27, respectively, to which an inlet pipe 28 and outlet pipe 29 are connected for circulating cooling water to internally cool these members with the water.

The combustion chamber case 11 has in its bottom wall a combustion gas outlet 30. The nozzle member 16 has a discharge nozzle 31 communicating with the gas outlet 30 and inclined in the direction of a tangent to the outer periphery of the rotary wheel 1. Disposed within the combustion chamber 10 at the opening of the gas outlet 30 of the case 11 is an agitating wall 63 for disturbing swirling gas streams in the chamber to promote mixing of fuel with air.

The lid 12 is formed with an inlet port 32 for compressed air and has a fuel injection nozzle 31 and an ignition plug 34. The inlet port 32 is in communication with a compressed air duct 35 which is connected at its forward end to an accumulator 36 to lead compressed air to the inlet port 32. Connected to the accumulator 36 is a compressor 38 which is driven by a gear 37 on the rotary shaft 5. When the rotary shaft 5 rotates, compressed air is produced and fed to the accumulator 36.

A valve 39 is slidably disposed in the air inlet port 32 and has a valve stem 40 extending therefrom. A spring 42 provided between the forward end of the valve stem 40 and a support 41 biases the valve 39 toward a direction to close the inlet port 32. A cam shaft 44 carrying an eccentric cam 43 is disposed above the valve stem 40. The cam shaft 44 is coupled to the rotary shaft 5 through a gear 45 and a chain 46 and moves with the rotation of the rotary shaft 5 to depress the upper end of the valve stem 40 and open the compressed air inlet port 32 with suitable timing.

The fuel injection nozzle 33 is connected to a fuel pump 48 operable by a gear 47 on the rotary shaft 5. The ignition plug 34 is coupled to a breaker 48a similarly coupled to a gear 47 on the shaft 5. The fuel is injected and a spark is produced by these means with suitable timing in timed relation to the rotation of the rotary shaft 5.

The exhaust ports 50 communicating with the paths of movement of the second blade rows are formed in opposite side walls of the casing 49, ahead of the discharge nozzle 31 toward the direction of advance of the rotary wheel 1. The exhaust gas is released through ducts (not shown) connected to the ports 50. Positioned further ahead of the exhaust ports 50 in the direction of advance are a fresh air inlet 51 formed in the peripheral wall of the casing 49 and communicating with the path of travel of the first blade row 2, and exhaust openings 52 formed in both walls of the casing 49 and communicating with the paths of travel of the final blade rows 6. The air inlet 51 is connected to means 53 for supplying fresh air under pressure.

Figure 3:
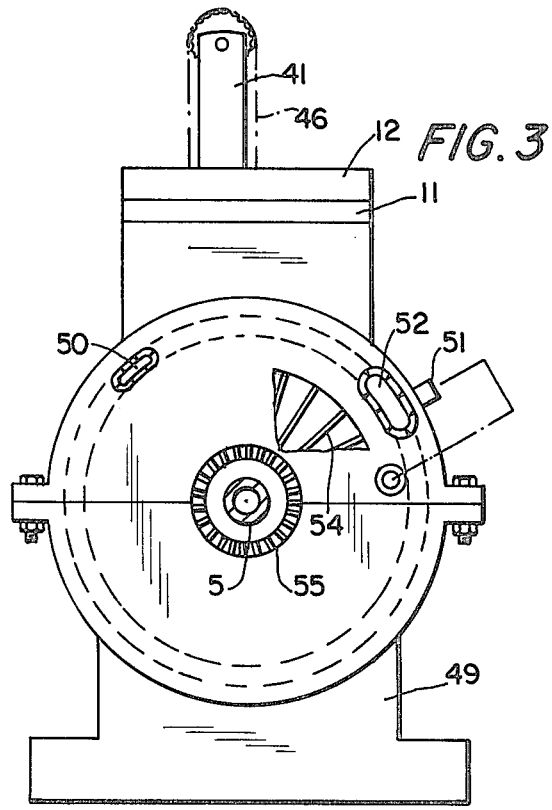
FIG. 3 is a front view of the engine.
Figure 4:
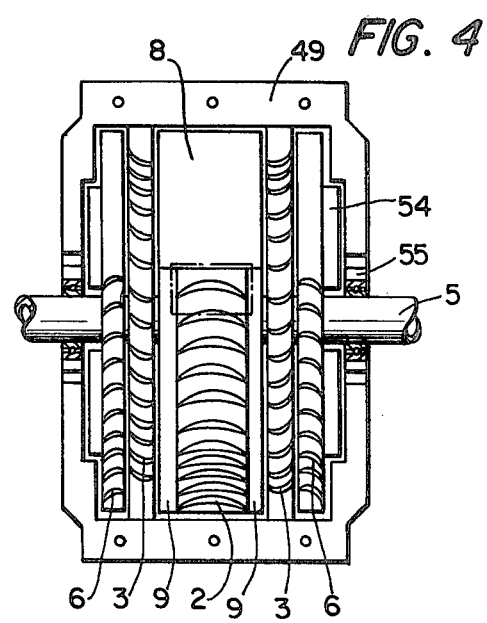
FIG. 4 is a sectional view showing the same as it is seen in the direction of the arrows IV—IV with an upper casing segment alone removed.

The fresh air supplying means 53 shown in FIGS. 2 and 3 comprises blades 54 provided on the outer sides of the plates 7 for the last blade rows for drawing fresh air into intake apertures 55 in the center of the casing and forcing the air through outlets 56 and channels 57 into the air inlet 51. The air supplying means 53 can be modified variously. For example, the air inlet 51 can be connected to the accumulator 36 through a channel to receive compressed air from the compressor 38.

The rotary wheel 1, stationary bladed plates 4, bladed plates 7 for the second and following rows of blades and rotary shaft 5, which are all heated by contact with hot combustion gas, are of a hollow construction. The cooling water inlet pipe 28 is branched and connected to the stationary bladed plates 4 for passing cooling water through the interior of the plates. The shaft 5 is provided at its one end with a rotary joint 58 for passing cooling water through the shaft and through the interior of the rotary bladed plates 7 and of the rotaty wheel 1. The water is run off from a rotary joint 59 on the other end of the shaft. The rotary shaft 5 drives an output shaft 62 via a train of gears 60 and 61.

Operation

In operation, when the forward end of the first row of blades 2 on the rotary wheel 1 in rotation is at a position immediately before the discharge nozzle 31 after passing the air inlet 51 (FIG. 5), the fresh air drawn into the blade row 2 through the inlet 51 has expelled the exhaust gas from the rows of blades 2 and 6 through the exhaust openings 52, filling the blade rows. The mixture of compressed air and fuel filling the combustion chamber 10 is exploded upon ignition by a spark produced by the ignition plug 34.

On explosion within the combustion chamber 10, a stream of combustion gas jets from the discharge nozzle 31 through the gas outlet 30 and impinges directly on the blades of row 2 on the rotary wheel 1 to drive the wheel (FIG. 6). Since the combustion gas produced in the combustion chamber 10 upon explosion directly strikes the first blade row 2 on the rotary wheel 1, little or no energy loss will result. The larger the diameter of the wheel 1, the greater is the resulting torque. The combustion gas impinging directly on the first blade row 2 becomes mixed with the fresh air filling the spaces between the blades to subject the unburned component of the gas to secondary combustion among the blades and flows into the rows of guide blades 3 while progressively expanding, whereupon the gas is turned and flows into the second rows of blades 6. When the second blade rows 6 pass the exhaust ports 50 with the rotation of the rotary wheel 1, the gas in the rows jets out from the exhaust ports 50 while giving torque to the second blade rows by reaction. Although the combustion gas jetting out from the discharge nozzle 31 of the combustion chamber 10 still contains a considerable quantity of unburned component, the gas becomes mingled with fresh air for secondary combustion while passing through the blade rows 2 and 6. Since the unburned component is thus eliminated, the combustion gas can be released from the exhaust ports 50 with air pollution inhibited without entailing a backfire.

When a majority of the blades of first row 2 on the rotary wheel 1 have passed the discharge nozzle 31 with several blades in the rear portion of the row remaining to the rear of the discharge nozzle 31 (FIG. 7), the valve 39 in the combustion chamber 10 is depressed by the eccentric cam 43 and opens the air inlet port 32, permitting compressed air in the accumulator 36 to flow through the duct 35 into the chamber 10 and scavenge the chamber 10 by expelling the exhaust gas from the chamber 10 into the blade row 2 through the discharge nozzle 31.

When the last of the blades on the rotary wheel 1 has passed the discharge nozzle 31 (FIG. 8), the circular arc surface 8 closes the nozzle 31. The wheel 1 is in rotation for continued secondary combustion among the blades and exhaust. In the combustion chamber 10, the valve 39 rises to close the inlet port 32 and confine the compressed air within the chamber 10. While the compressed air strikes the agitating wall 63 when injected into the chamber 10 from the inlet port 32 and is therefore turbulent, the fuel injected from the injection nozzle 33 as atomized mixes with the stream of compressed air. The cycle starting with the ignition process of FIG. 5 is repeated.

According to the present invention, the processes of FIGS. 5 to 8 are repeated which involve ignition, explosion, exhaust and injection of fuel in the combustion chamber 10. The impact resulting from every explosion is delivered to the rotary wheel 1 to rotate the rotary shaft 5 and drive the output shaft 62.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A turbine-type internal combustion engine housed in a casing and comprising:
   a rotary wheel having a circumference and a first row of blades arranged along a portion of said circumference and a circular arc surface formed on a remaining portion of said circumference, said rotary wheel having approximately the same radius as an inner surface of said casing;
   a combustion chamber disposed above said casing having a discharge nozzle opening approximately tangentially to said rotary wheel;
   a fuel supply means and an ignition means disposed in said combustion chamber;
   said combustion chamber being in communication with a compressed air duct through a valve;
   said casing being formed with exhaust ports positioned ahead of the orifice of the discharge nozzle with respect to a direction of advance of said rotary wheel;
   an air inlet for introducing fresh air to said blade row;
   exhaust openings positioned ahead of said exhaust ports with respect to said direction of advance of said rotary wheel;
   at least one additional row of blades on said rotary wheel arranged parallel to said first row of blades; and
   guide blades interposed between said first row of blades and said at least one additional row of blades and fixed to said casing, said guide blades being operable for changing the direction of flow of exhaust gas from said first row of blades to guide said exhaust gas to said at least one additional row of blades.

2. An internal-combustion engine as defined in claim 1, wherein said first row of blades are connected together at their forward ends by connecting plates continuous with a circular arc of the circular arc surface and in contact with the inner surface of the casing.

3. An internal-combustion engine as defined in claim 2 wherein the discharge nozzle is formed in a nozzle member hermetically and slidably fitted to the casing and pressed against a periphery of the rotary wheel.

4. An internal-combustion engine as defined in claim 1 wherein the guide blades form a row of blades and the at least one additonal row of blades consist of a pair of rows of blades arranged symmetrically on both sides of the first blade row and wherein the exhaust ports are formed in opposed walls of the casing in a symmetric arrangement.

5. An internal-combustion engine as defined in claim 1 wherein the air inlet communicates through a channel with a downstream side portion of the rotary wheel where air supply blades are disposed.

6. An internal-combustion engine as defined in claim 1 wherein the air inlet communicates with an air compressor.

7. An internal-combustion engine as defined in claim 1 wherein said guide blades and said at least one additional row of blades are arranged on both sides of said first row of blades, and the exhaust ports and the exhaust openings are formed in opposed walls of the casing and opposed to a downstream side of said at least one additional row of blades.

* * * * *